(12) United States Patent
Frisco et al.

(10) Patent No.: US 10,806,996 B2
(45) Date of Patent: Oct. 20, 2020

(54) LIGHT SPHERE DISPLAY DEVICE

(71) Applicants: Scott Frisco, Haverhill, MA (US); Steve Strumpf, Rockport, MA (US)

(72) Inventors: Scott Frisco, Haverhill, MA (US); Steve Strumpf, Rockport, MA (US)

( * ) Notice: Subject to any disclaimer, the term of this patent is extended or adjusted under 35 U.S.C. 154(b) by 110 days.

(21) Appl. No.: 15/871,400

(22) Filed: Jan. 15, 2018

(65) Prior Publication Data

US 2018/0200618 A1     Jul. 19, 2018

Related U.S. Application Data

(60) Provisional application No. 62/446,077, filed on Jan. 13, 2017.

(51) Int. Cl.
| | |
|---|---|
| *A63F 13/25* | (2014.01) |
| *A63F 13/24* | (2014.01) |
| *A63F 13/822* | (2014.01) |
| *A63H 33/26* | (2006.01) |
| *A63F 13/235* | (2014.01) |
| *A63F 13/92* | (2014.01) |

(Continued)

(52) U.S. Cl.
CPC ............ *A63F 13/25* (2014.09); *A63F 13/235* (2014.09); *A63F 13/24* (2014.09); *A63F 13/245* (2014.09); *A63F 13/428* (2014.09); *A63F 13/822* (2014.09); *A63F 13/92* (2014.09); *A63H 33/26* (2013.01); *F21V 14/02* (2013.01); *A63F 13/211* (2014.09); *A63F 13/214* (2014.09); *A63F 2300/8064* (2013.01); *F21Y 2105/18* (2016.08); *F21Y 2115/10* (2016.08)

(58) Field of Classification Search
USPC .......................................................... 463/31
See application file for complete search history.

(56) References Cited

U.S. PATENT DOCUMENTS

| | | |
|---|---|---|
| 6,697,034 B2 | 2/2004 | Tashman |
| 7,862,415 B1 | 1/2011 | Ghaly |

(Continued)

FOREIGN PATENT DOCUMENTS

CN         204680332       9/2015

OTHER PUBLICATIONS

Benko, H., et al., "Sphere: Multi-Touch Interactions on a Spherical Display," UIST'08: 77-86 (Oct. 19-22, 2008).

*Primary Examiner* — Pierre E Elisca
(74) *Attorney, Agent, or Firm* — HoustonHogle LLP

(57) ABSTRACT

A light sphere display device is disclosed that provides a persistence of vision (POV) light field display. The device is preferably globe-shaped and has a transparent outer globe with an outer surface having touch-sensitive capability that enables user interaction and control of the device. In embodiments, the device provides a 360 degree POV display as seen on the outer surface, by rotating a support bar having an attached circuit board including LEDs about one or more axes of rotation within the device. The device can be held in the hands of a user, or placed upon one or more gaming accessories such as gaming guns, presentation bases, and action figures. The device communicates with the accessories to provide augmented virtual reality displays of the accessories and to provide interactive gaming displays, in examples. The device also displays images and receives interactive games sent over wireless connections from cell phones.

15 Claims, 12 Drawing Sheets

(51) Int. Cl.
  *F21V 14/02*   (2006.01)
  *A63F 13/428*  (2014.01)
  *A63F 13/245*  (2014.01)
  A63F 13/211   (2014.01)
  F21Y 105/18   (2016.01)
  F21Y 115/10   (2016.01)
  A63F 13/214   (2014.01)

(56) References Cited

U.S. PATENT DOCUMENTS

| | | |
|---|---|---|
| 9,176,602 B2 | 11/2015 | Sesto et al. |
| 2007/0247439 A1 | 10/2007 | Daniel et al. |
| 2009/0189857 A1* | 7/2009 | Benko .................. G06F 3/0421 |
| | | 345/158 |
| 2010/0014164 A1* | 1/2010 | O'Brien ............... D04H 1/4374 |
| | | 359/599 |
| 2010/0020026 A1 | 1/2010 | Benko et al. |
| 2012/0244969 A1 | 9/2012 | Binder |
| 2016/0102849 A1* | 4/2016 | Kwok ..................... F21V 14/00 |
| | | 362/363 |

* cited by examiner

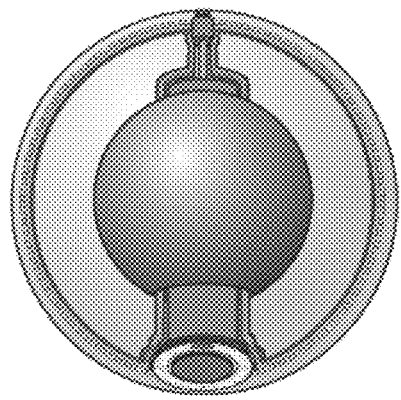
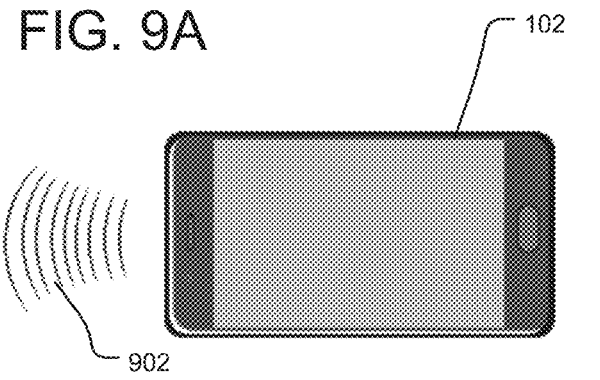
FIG. 9A
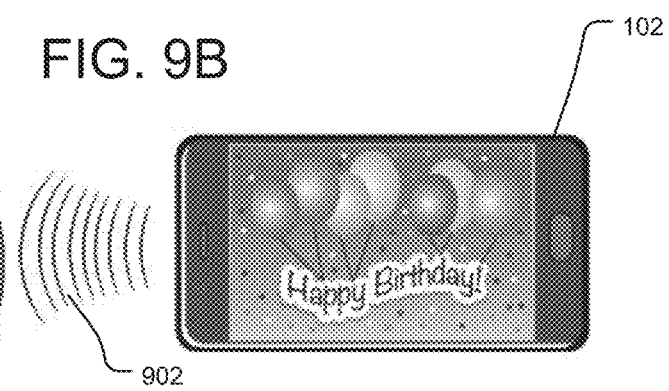
FIG. 9B
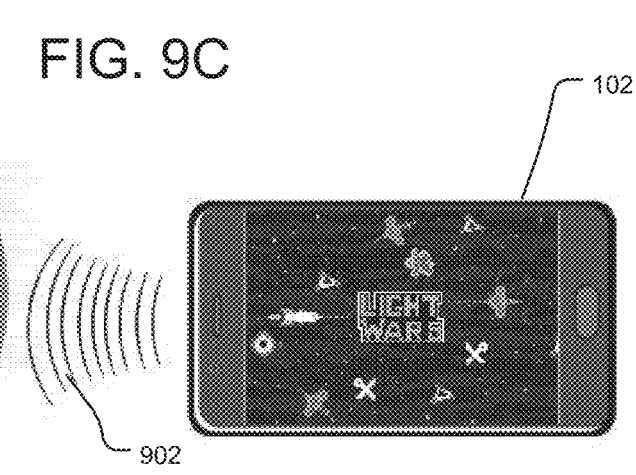
FIG. 9C

LIGHT SPHERE DISPLAY DEVICE

RELATED APPLICATIONS

This application claims the benefit under 35 USC 119(e) of U.S. Provisional Application No. 62/446,077, filed on Jan. 13, 2017, which is incorporated herein by reference in its entirety.

SUMMARY OF THE INVENTION

This invention is a light-up ball-shaped, preferably spherical, device that is a three dimensional, 360 degree screen. That is, images or other patterns are displayed on the surface of the device from light generated within the device. The user then interacts with the ball device by turning it in their hands or rolling it, for example.

There are a number of ways of implementing the device. It can have an internal sphere of LEDs that project light outward through a transparent outer shell, for example. Alternately, the ball can have an internal scanning mechanism that creates the illusion of a full screen of lights below and inside the transparent outer shell.

The device is a three-dimensional spherical visual display and gaming system that is controlled by rotating the sphere on one or more axes. In one embodiment, the spherical visual display is created by rotating a strip of light emitting diodes (LEDs) about a central control box fast enough to exploit the concept of persistence of vision. The user perceives the sphere's surface as a single display or image instead individual LEDs.

In a prototype, 64 LEDs are mounted to a curved circuit board spinning around an internal axis of the transparent outer shell. This creates the illusion of 16,400 LEDs. It should be appreciated, however, that this device could have from 5-10,000 LEDs mounted to the circuit board depending on the application and create the illusion of up to 3,800,000 LEDs.

3-D orientation sensors and three accelerometers, enable the device to learn its 3-D orientation in the three spatial dimension of space and provide that as input to a controller in the central control box to enable any number of games that may be played. By rotating the LEDs inside the sphere, a video screen is created 360 degrees around the surface of the sphere device much like an LED TV or computer screen. By turning the sphere or pressing buttons, a player interacts with the 360 degree video game executing on the controller.

In general, according to one aspect, the invention features a display device, comprising:

an outer globe and a display system inside the globe that includes one or more rotating bars of light elements.

In embodiments, the rotating bars include lines of light emitting diode (LED) light elements. The device rotates the one or more bars within the outer globe about at least one axis of rotation to provide a persistence of vision (POV) light display perceived at the outer surface of the outer globe.

In one example, the bars comprise two arcuate support bar branches disposed oppositely to one another with respect to a center axis of the device. Each of the arcuate support bar branches have attached curved PCBs of LEDs.

The device rotates the bar about the top center axis to provide a 360 degree POV light display perceived at the outer surface of the outer globe.

In another example, the bar is flat support bar that the device rotates about a mid center axis to provide a POV light display upon a portion of the inside surface of the outer globe.

In general according to another aspect, the invention features a display method for a spherical device. The method comprises projecting light from an inside of an outer globe of the spherical device and controlling the projection of the light based on an orientation of the spherical device.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIGS. 9A-9C show different light sphere display devices communicating over a wireless channel with mobile user devices such as cell phones, where FIGS. 9A and 9B show light sphere display devices receiving and displaying different images sent over the wireless channel from cell phones, and where FIG. 9C shows a light sphere display devices receiving and executing an interactive game sent over the wireless channel by a cell phone;

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1A:
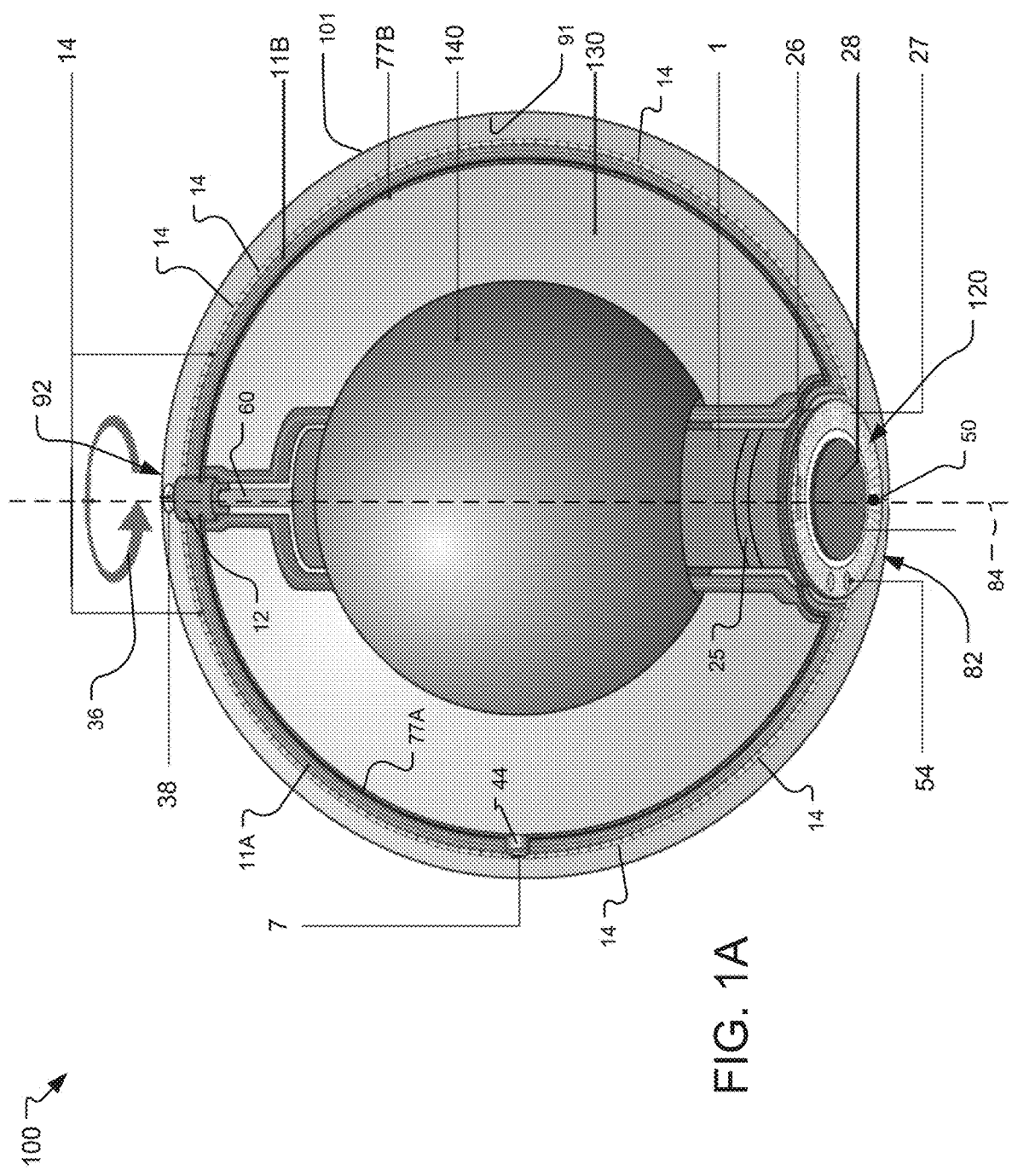
FIG. 1A is a schematic perspective view showing an embodiment of a light sphere display device that provides a 360 degree persistence of vision (POV) light display.

FIG. 1A shows an embodiment of a proposed light sphere display device 100. At a high level, the device 100 includes an outer globe 130, a central globe housing 140, a battery box 1, and a rotating support bar 77 having branches 77A and 77B.

The device 100 provides a 360 degree POV light up sphere for use as a hand held gaming or entertainment device, in one example. Users hold the device 100 within their hands or use the device 100 in conjunction with an external display device. The device 100 has accessories including a mini Universal Serial Bus (USB) power jack and computer 26 for charging and data transfer, and a control button 28 such as a 4-way joystick located at a base 82? of the device 100, an audio speaker 27, one or more microcameras 44 having wide angle lenses 7. The device 100 also provides Bluetooth communications with external devices such as cell phones, and uses WiFi for controlling various components within the device 100.

The outer globe 130 has a top portion 92, an inner surface 91, an outer surface 101, and a base 82. The outer globe 130 provides a protective shell for the device 100. The outer globe 130 is preferably hollow spherical in shape and is preferably made of a clear or transparent material such as plastic. In a preferred embodiment, the transparent outer surface 101 is touch sensitive. Specifically, the outer globe 130 has an array of capacitive sensors that are monitored by a controller. This yields a spherical touch screen display device. In this way, a user interface input device such as a graphical user interface (GUI) is provided by the outer globe 130.

Curved PCB boards 11A and 11B are attached to rotating support bar branches 77A and 77B, respectively. Light emitting diodes (LEDs) 14 are attached to each of the curved PCB boards 11A and 11B. In a preferred embodiment, the curved PCB boards 11A and 11B include a combined number of 64 Red/Green/Blue LEDs 14, that almost form an entire circle. The LEDs 14 might be full or single color low profile LED lights that run up both rotating support bar branches 77A/B.

At the top 92 of the outer globe 130, the rotating support bar 77 attaches to a top spinning anchor bearing 12. The anchor bearing 12, in turn, is attached to a motor shaft 60 that rises out of the central globe housing 140 towards the top 92 of the outer globe 130.

The rotating support bar branch 77A rotates about top center axis 84 as a pivot point. The top center axis 84 runs north-south from the top 92 to the base 82. A direction of rotation 36 is also indicated. There is a break at the base 82 of the device 100 where the edges of the curved PCB boards 11A and 11B rotate about a plastic connector that attaches the central globe housing 140 to the outer globe 130. The central globe housing 140 also attaches to a battery box 1 that includes a rechargeable battery.

In one implementation, microcameras 44 are also embedded onto the curved PCB boards 11A and 11B. The microcameras 44 typically have wide angle lenses 7. The placement of one or more microcameras 44 within the curved PCB 11 enable the device 100 to take a 360-degree snapshot of image data of the scene. This could be incorporated into an Augmented Reality game. It could be linked to other Light Spheres and retrieve their visual data and display it on its own 3D visual surface. The cameras 44, when linked with LEDs 14 located on the opposite side of the cameras 44, might operate as a rudimentary novelty invisibility cloak. The cameras 44 would be taking pictures of the opposite side of the device 100, and project those same colors on the corresponding GUI/light field that is seen by the user. In another implementation, the microcameras 44 are fixed and included within the outer sphere 10.

While not shown in FIG. 1A, the central globe housing 140 includes/houses various components that control and operate the LEDs 14 and the curved PCB boards 11A/11B, enable rotation of the rotating support bar 77, and provide control and power for other various components. The central globe housing 140 also provides a protective covering for many of these components. Many of these components are shown in detail in the cutaway view of the device in FIG. 1B, described herein below.

Exemplary components of the device 100 include but are not limited to a DC motor assembly 2 ("motor"), one or more microcontrollers, one or more 3D orientation sensors 10, a wireless (e.g. WiFi) transceiver 5, an audio driver 20, and a Bluetooth transceiver module 3.

The battery box 1 has a plate 120 that extends through to the outer surface 101 of the outer globe 130 and is exposed to the user. The plate 120 enables connection to various power and communications input/output, and includes power switches and physical controls such as input buttons. The plate 120 is located at the base 82 of the outer globe 130 as shown in FIG. 1A, in one implementation.

The plate 120 includes a Mini Universal Serial Bus (USB) jack 26 and associated computer for data and charging of the device 100, metal contacts 54, a control button 28 such as a 4-way joystick, an audio speaker 27 for music and sound output, and a headphone jack 50. The plate 120 also enables external Bluetooth communications with the Bluetooth transceiver module 3. The Bluetooth transceiver 3 provides a wireless channel for communications with mobile user devices such as smart phones 102 and other electronic devices.

The 4-way joystick button 28 or toggle switch might be directional as well as providing input. Additionally, other small buttons might be mounted across the outer surface 101 of the outer globe 130? for inputs, in different implementations.

The motor 2 is connected to the motor shaft 60, which in turn rotates the rotating support bar 77. When powered, the motor 2 drives the rotating support bar 77 and causes it to rotate around the central globe housing 140, about top center axis 84. As the motor 2 spins, the LEDs 14 create a continuous, seamless full color light field or animated display from the perspective of an observer/individual. The LEDs 14 display light towards the inner surface 91 of the outer globe 130, so that individuals may observe and interact with the displayed light at the outer surface 101 of the outer globe 130.

In one implementation, the curved PCB boards 11A and 11B each include 32 LEDs 30. The LEDs 14 on opposite rotating support bar branches 77A and 77B are offset in a polar angular direction from each other by about ½ the width of a single LED 14. This provides the illusion of a single column of 64 LEDs 14. For example, as an LED 14 of rotating support bar branch 77A rotates 180 degrees, it will "fill in" the space between two LEDs 14 of opposing 14 rotating support bar branch 77B. The device's longitudes are broken up into 256 slices. Therefore, one slice is approximately 1.4 degrees of the 360 degree circumference.

A magnet switch or sensor 18 is also mounted on at least one of the curved PCB boards 11. During the rotation of the rotating support bar 77, when the magnet sensor 18 reaches a magnet 31 mounted on the outer globe 130 at a point somewhere along an equator of the device 100, a microcontroller synchronizes the position of the rotating support bar 77. From that point on, at every 1.4 degrees, the microcontroller updates the LEDs 14 of curved PCB boards 11A and 11B, corresponding with their respective positions within the spherical image that is being displayed. When the magnet sensor 18 reaches the magnet 31 mounted on the outer globe 130, the process repeats itself, and potentially displays a different image in the next revolution of the rotating support bar 77.

One of the unique features of the device 100 is that its DC motor assembly 2 is mounted within the core of the device 100 (e.g. included within the central globe housing 140), as opposed to being within a large and bulky base external to the device 100. This gives the feel of a handheld gaming device experience, versus a stand-alone visual display only.

The rotating support bar 77 (and curved PCBs 11) have a portion removed at the bottom, which allows the central globe housing 12 to be statically attached to the outer globe 12. This provides a fixed mounting position for the components of the device 100 that need to remain fixed with reference to the outer globe 12. These components include the DC motor 2 that drives the rotating support bar 77, the 3D orientation sensor(s) 10, and larger electronic components such as the Bluetooth transceiver module 3 and audio speaker 27.

The 3D orientation sensors 10 are mounted to a control printed circuit board (PCB) 15. A microcontroller 17 also mounted to the control PCB 15 constantly queries these sensors 10 to determine the orientation of the device 100 in 3-space and to determine its orientation within a gravitational field. The 3D orientation sensors 10 are preferably three mutually orthogonally oriented accelerometers. These sensors 10 can detect the device's orientation in 3-space and uses this information to control a game, in one example. More detail for the 3D orientation sensors 10, the control PCB 15, and the microcontroller 17 is provided within the description that accompanies FIG. 1B, included herein below.

The microcontroller 17 communicates with the curved PCB boards 11A/11B via a wireless link provided by the wireless transceiver 5. The link transmits picture and sound effects information. In other examples, the communication can take place via a slip ring system.

Updates are delivered to the device 100 over a Bluetooth connection provided by the Bluetooth transceiver module 3. Such a capability provides more games, better graphics, and better sound.

An audio driver (not shown) drives the audio speaker 27. In this way, the device 100 can play pre-recorded sound clips (explosions, voice instructions, etc.).

The spherical visual display provided by the device 100 exploits the scientific principle of persistence of vision (POV), whereby several discrete columns of LEDs 14 blend together and the human brain perceives them as a single image. This blending happens whenever the frame rate is sufficiently high—in the case of the device about 20 rotations per second or more.

This invention is not limited to a handheld sphere. It could be a cylinder, cube, table top game, flat device and/or LED strip. This invention could be used for non-gaming application such as creating circular computer screens using moving LEDs.

This invention could use side to side LEDs that create a flat screen. The benefits of this would be creating a video screen that fits in your pocket but when turned on creates the illusion of a video screen possibly 20 times its size.

Other spherical display options include spherical displays. In one example of a spherical display, the device's 100 spherical display may be created in any number of ways. In this version, it is created by rotating an arcuate line of lights around the entire sphere and exploiting the principle of POV. The display might also be created by wrapping the sphere with a malleable display technology, similar to those that cell phones use. This would eliminate much of the mechanical requirements for the device 100 and potentially enable a touch-sensitive playfield.

The display could also be created by populating the device's 100 surface with discrete lights, without the use of a rotating support bar 77/curved PCB 11 combination. The device need not be hand held. The sphere could be embedded into a base with ball bearings that allow the sphere to rotate while embedded inside the base. This provides a unique interface as the user would be able to scroll around a virtual environment by rotating the 3D sphere.

In another example of a spherical display, a rotating tilting mirror that projects an image on the inside of a frosted outer globe/ball 130 might create a game play 360 degree surface.

Figure 1B:
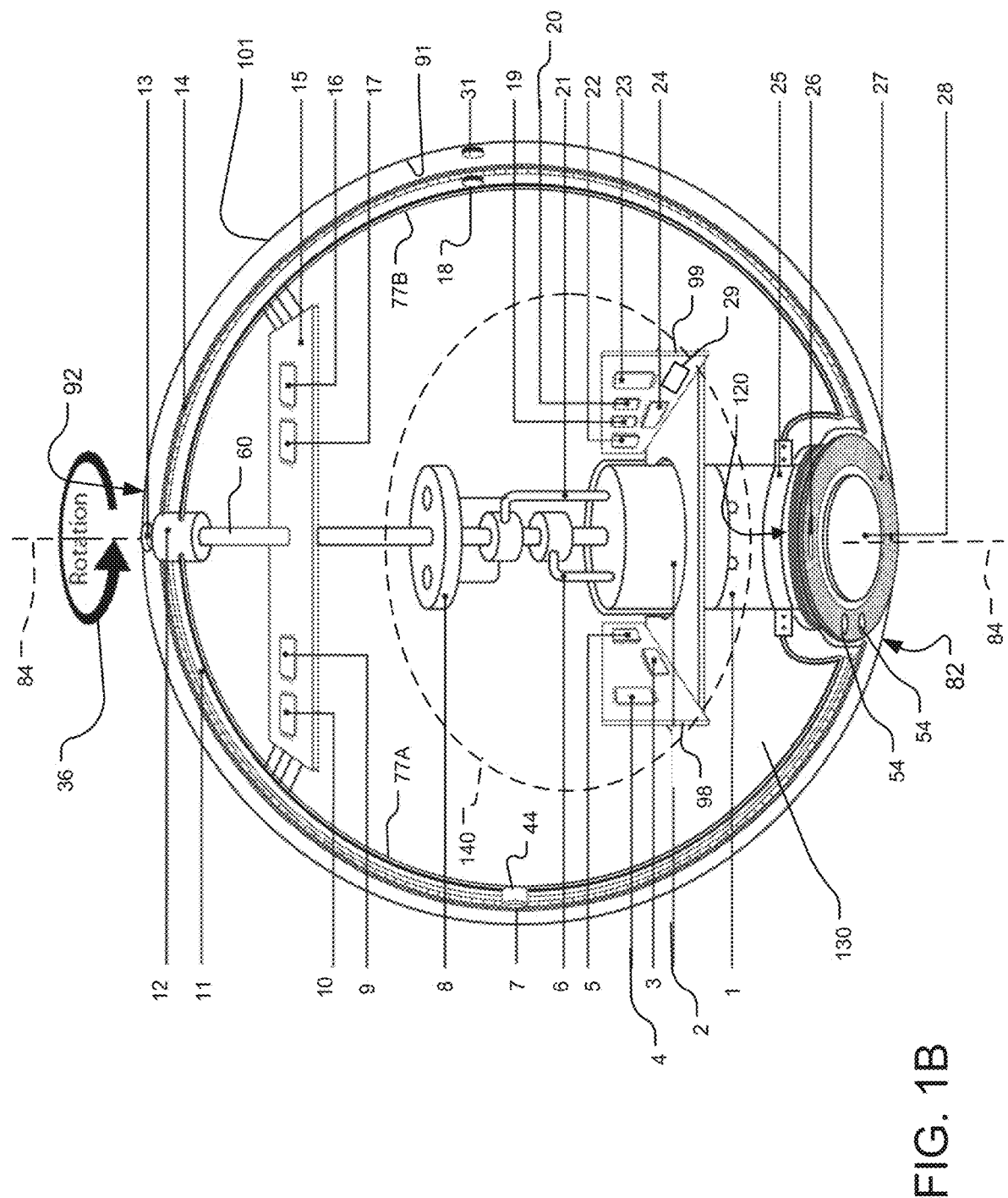
FIG. 1B is a cutaway schematic view of the proposed light sphere display device in FIG. 1A that shows various electronic components within the device.

FIG. 1B is a cutaway view of the device in FIG. 1A. Such a view enables description of various components housed within the central globe housing 140 that could not be shown in FIG. 1A, and other components of the device 100.

Magnet switch 18 is fastened to curved PCB 11 (here, curved PCB 11A). The magnet switch 18 is preferably omnipolar (i.e. has both a north and south). Magnet 31 is included within the inner surface 91 of outer globe 130.

Battery box 1 includes a rechargeable battery such as a lithium battery. The plate 120 at the bottom of the battery box 1 includes metal contacts 54, headphone jack 50, mini USB power jack 26 and associated computer, and a control button 28 such as a 4-way joystick. A bottom spinning anchor bearing 25 of the battery box 1 is also shown. The top of battery box 1 is attached to motor 2. The motor 2 turns motor shaft 60.

In the illustrated example, the following components are included within/housed by the central globe housing 140: motor 2, Bluetooth transceiver module 3, axis orientation sensor 4, WiFi transceiver 5, power communicator 6, coupler 8, power communicator 19, audio driver 20, voltage regulator 21, a Radio Frequency (RF) integrated circuit 22, microcontrollers 23 and 24, and a Hall effect sensor 29.

The Bluetooth transceiver module 3, axis orientation sensor 4, and WiFi transceiver 5 are mounted to circuit board 98. The power communicator 19, RF integrated circuit 22, microcontrollers 23 and 24, and the Hall effect sensor 29 is mounted to circuit board 99.

The voltage regulator 21 is an ADP3338, in one example. The Hall effect sensor 29 is an A1126, in one example. The RF IC 22 is an NRF24L01, in one example. Microcontroller 23 is a C8051F531A, in one example. Microcontroller 24 is an 8-bit microcontroller such as an ATXMEGA384C3, in one example.

Control PCB 15 includes: wireless device 9 that provides wireless communications (e.g. WiFi) for controlling the curved PCBs 11A/B, the one or more 3D orientation sensors 10, an LED driver 16, and a microcontroller 17. The LED driver 16 is a TLC5925, in one example. The microcontroller 17 is a C8051F360, in one example.

The anchor bearing 12 includes a microphone 13 located typically at the top 92 of the outer globe 130. The microphone 13 is wired to the control PCB 15 and accepts voice commands and can be utilized for input recording and communication, in examples.

Embedding a Bluetooth transceiver module 3 inside the device 100 enables wireless connectivity to the outside world. This expands the capability of the device by integrating real-time information into many different application concepts. For example, the device could act as a static display, constantly displaying information like the time, weather, sports scores, or custom data like your twitter feed or stock prices. Because the device 100 also has a built-in audio speaker 27, a Bluetooth connection provided by the Bluetooth transceiver module 3 could sync with a personal music player and stream music. The Bluetooth transceiver module 3 also enables the device's capabilities to be upgraded with new releases of games or apps designed for the device.

A GPS transceiver might also be embedded within the device 100 enabling it to be geolocation-aware. Geo-filters could be created for the device depending on where the device is on the planet, country, city, street, etc., it may have different borders or themes. The device 100 could then "check in", if it were linked to your phone via the Bluetooth connection. The sphere could be blue toothed or wired to your phone and create a soft glow, rainbow light swirl for mood lighting or as a music strobe light.

The device 100 also supports locomotion. State of the art locomotion technology like that found in Star Wars' BB8 could enable the device to propel itself around a room. Coupled with the embedded microcameras 44 and audio speaker 27, the device 100 becomes a unique mobile robot.

Novel games can be created that take advantage of combining the 3D orientation sensor 10 with a full 360-degree visual display provided by the device 100. For example, the first game developed on the device 100 fixed the player's avatar at some reference point in 3D-space (e.g., pointing in the direction of a single wall in the room that the player is playing in). The avatar's motion on the visual display's game board is then controlled by rotating the sphere—the avatar would then "move" in the opposite direction of rotation. This concept can be applied to many game themes such as collection of treasures, maze games, or action/combat games. New spins could also be applied to classic games like Snake, Asteroids®, Pacman®, Flappy Bird®, Pinball, Space Invaders®, or a brick-breaking game like Breakout® or Brickles®. There could also be trivia based games played on the ball that is passed around, a written trivia question could be displayed across the sphere. This could be combined with visual video and audio clues to create a fully 3D experience.

Integration of 3D orientation sensors 10 enables a three-dimensional take on cell phone swiping. A graphical user interface including, for example, game play selection or menu options is displayed and rendered on the outer shell. The device 100 can be controlled by the user through slight rotations (or "swipes") in certain directions to control certain things. Full length menus can be navigated by rotating the sphere in the direction the user wishes to browse to. Accelerometers can be used to detect abrupt movements by the user that could be interpreted as a click or selection of option. In one example, the user sharply twists the sphere to the left 20 degrees indicating an input to the sensor. In another example, the user scrolls through a menu up or down on the sphere by rotating it horizontally and when the answer they want is highlighted, they sharply twist the sphere to the left 20 degrees to input the sensor.

The device 100 enables various forms of gaming/game play. Exemplary of types of game play are disclosed herein below.

Pacman®: A maze is displayed 360 degrees around the ball of the device 100. The path is connected all the way around the ball with a dotted line on the inside of the maze path. Your Pacman® character appears at the center of the game on the start position and the ghosts appear around the ball. Turn the sphere along the X-Y axis to move through the maze and eat as many of the dotted lines as you can before you are caught by the ghosts. Eat the blue blinking spheres to power up and eat the ghosts for extra points. Once you have eaten all the dots inside the maze, drop through hole along the maze path to enter other levels in the game. This could be a point/time based game that is passed around a group of from 1-5 players.

Asteroids®: The sphere is covered in deep black space with twinkling white stars that are different sizes to give depth created by turning on/off LEDs. On the ball, a ¼ inch triangle shaped ship appears (This is your ship) when you turn the sphere in your hand along the X-Y axis a tail of flames appears to show which direction the ship is moving. Turn the ball in your hands and try to catch power up energy spots on the ball. (AKA: yellow glowing asteroids) When you catch an energy ball there's a light explosion that tells the player they got it. Avoid the different floating space junk and the alien ships that are hunting you down to get a high score or level up. This can be a timed game of 45 seconds. Play for high score or a 1-5 player game that gets passed around after a 20 second play. Each player has 5 turns to collect energy balls and extra point objects to get the high score. Gameplay interface: Your ship appears at the top of the sphere, rotate the sphere along the X-Y axis. The faster you rotate the higher your score. This is an eye hand coordination game. 1-5 player game.

Snake: Start out as a small snake, turn the sphere to move your snake around the ball. Eat food to grow your snake while avoiding the obstacles. Once you eat all the balls on the sphere, that level is complete. Move to the next level with different obstacles, new bonuses and new hazards. 1-5 players, high score based winning.

Pinball: You are the pinball, bounce around the sphere to add up points. Turn the sphere to control the ball and avoid pitfalls while adding points by hitting targets. The entire sphere is covered with pinball bumpers, slides, paddles and doors. Score double, triple and bonus points before you end up in a gutter hole. Play from 1-5 players, time/high score based games.

Trivia games: A computer generated moderator appears inside the sphere, he directs gameplay with written trivia, visual trivia and audio trivia. Enter answers by turning the sphere to highlight the correct displayed answer or using sound recognition, ("A"). This game could use a Bluetooth to the internet for music, science, useless trivia. 1-6 player game could be played in teams or individually.

Magic fortune teller: The ball can tell your fortune by answering all your questions. Shake the sphere to swirl colors across the globe. Ask the sphere a question out loud. A Yes/No or Maybe will appear on the side of the sphere.

Puzzle: Build a 3D puzzle across the sphere by moving your curser around the sphere and highlighting a piece. Once it is highlighted, move it around the sphere until it locks in the correct location. This could be a timed game or fun picture or word puzzle.

Figure 2A:
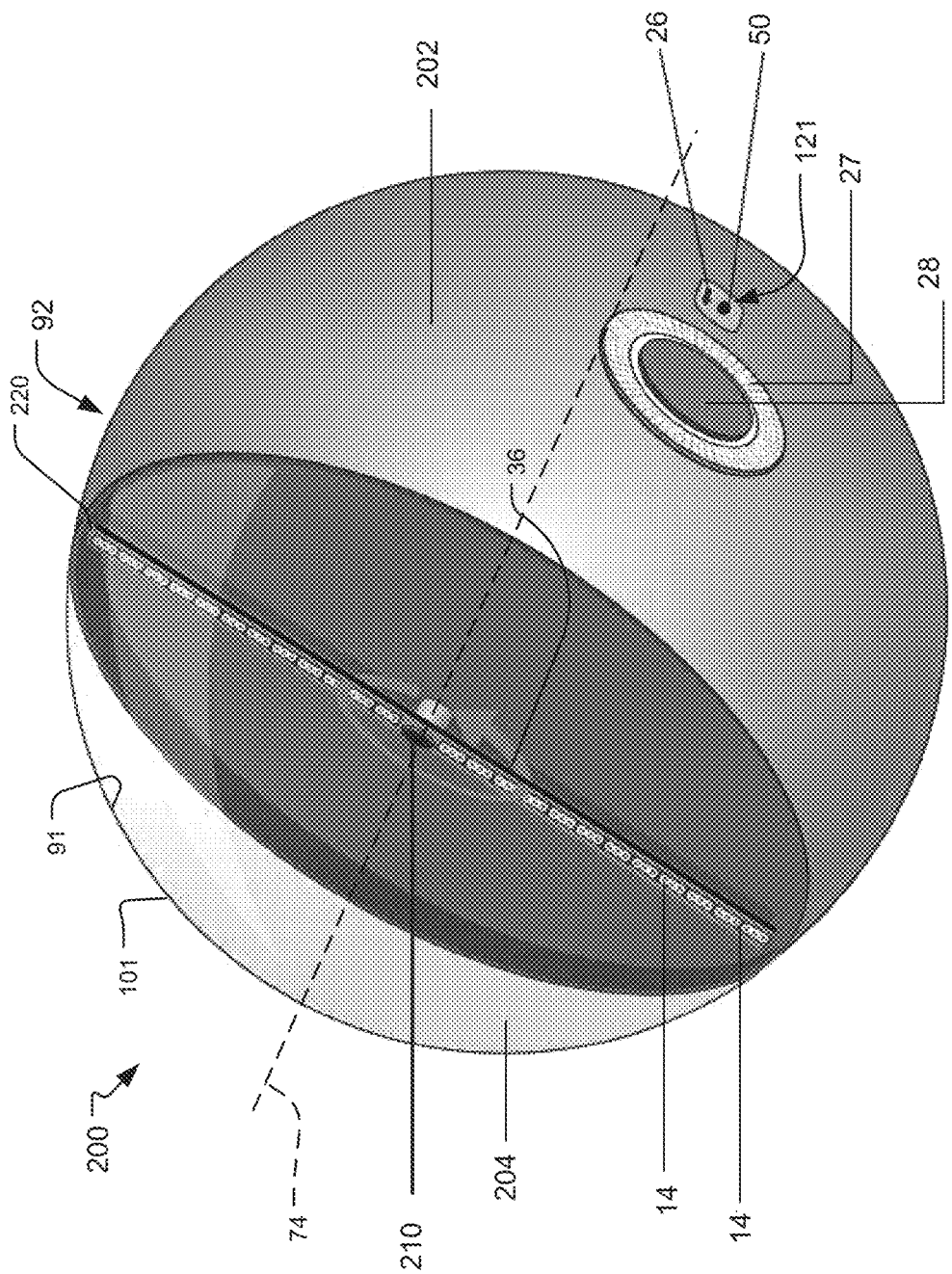
FIG. 2A shows another embodiment of a light sphere display device that provides a point of view (POV) light display, via a flat plane enclosed by a dome top of the display.

FIG. 2A illustrates another embodiment of a light sphere display device 200 constructed according to principles of the present invention. The device 200 creates a POV display on a flat plane.

In more detail, device 200 has an outer housing 202 that houses similar components as those included within the central globe housing 140 of the device 100 in FIG. 1A/1B. For example, the outer housing 202 includes a rechargeable battery, 3D orientation sensors 10, and a wireless transceiver 5. The device 200 has a clear plastic dome top 204 as a cover. The dome top 204 is made from a touch screen material, in one example. Also located on the outer housing 202 are mini USB jack 26, 4-way joystick button 28, audio speaker 27, and headphone jack 50. Here, the headphone jack 50 and mini USB jack 26 are included within a connector plate 121.

LEDs 14 are attached to a flat PCB 33. Here, the LEDs 14 are full color or one color low profile LEDs, in examples. The flat PCB 33 is attached to a flat support bar 220. The combined flat PCB 33/flat support bar 220 rotate in a propeller-like manner around center point 210, about mid center axis 74, in direction 36. A three-dimensional image (3D) is created using intensity of LED brightness & tromp l'oeil. The LEDs 14 can be multicolor or single color, in examples.

By using such a flat POV propeller-like display, different products can be created. Examples include displays, games, smart technology devices, interactive devices with visual 3D displays such as Siri, in examples. Siri is a registered trademark of Apple, Inc. This device 200 can be handheld or mounted.

Figure 2C:
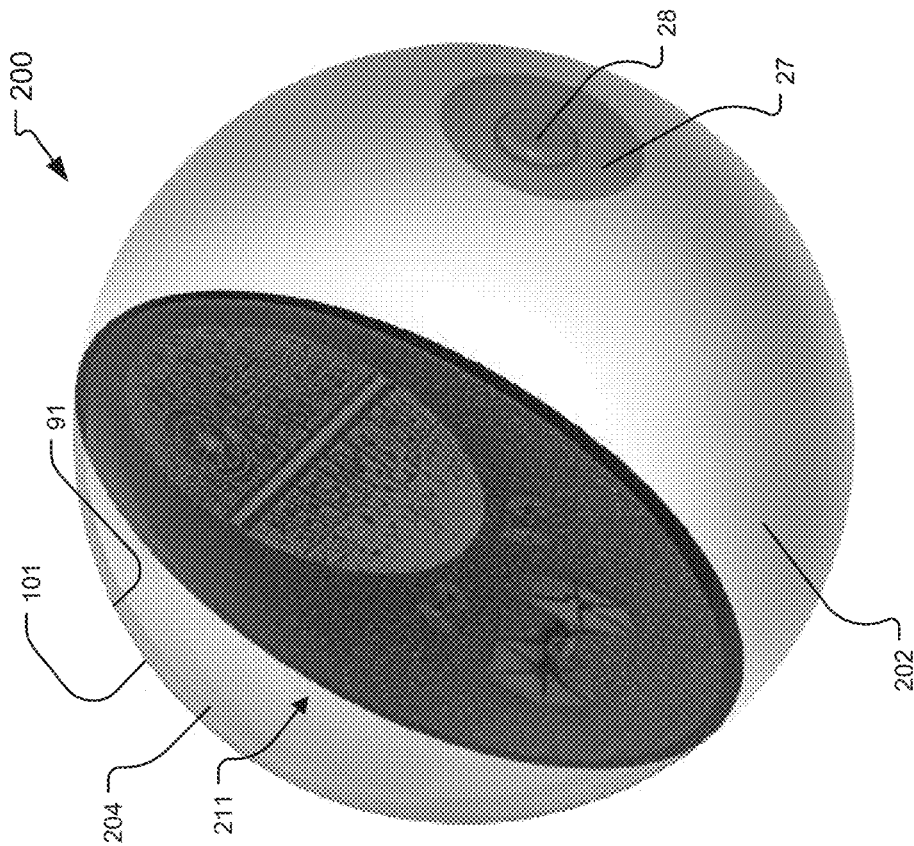
FIG. 2C shows a side view of the device in FIG. 2A.
Figure 2B:
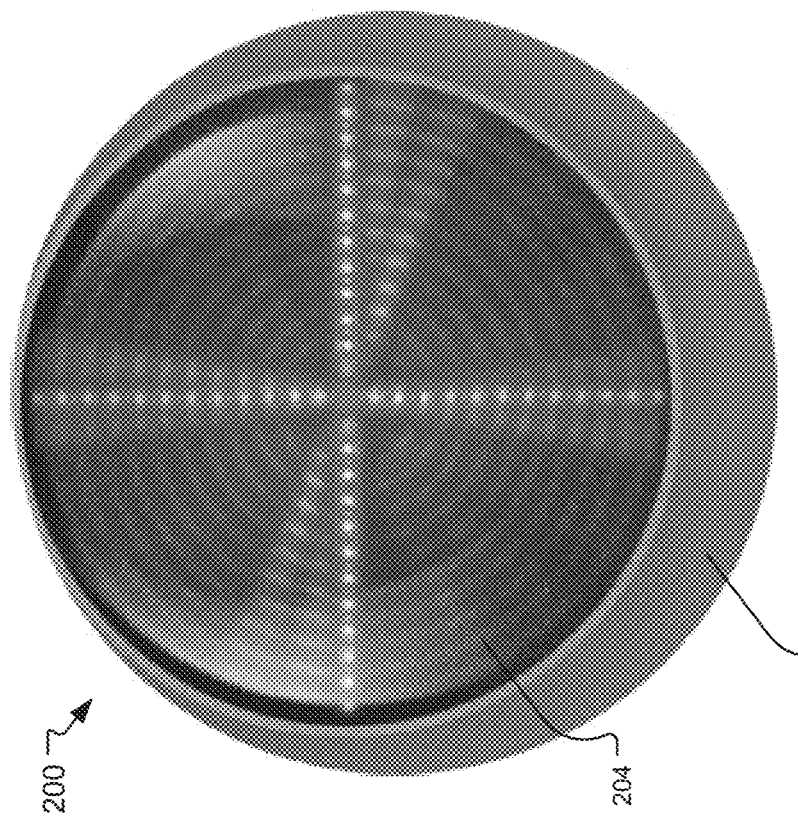
FIG. 2B is a view of the light sphere display device in FIG. 2A, with the dome top of the device facing the viewer.

FIG. 2B is a view of the light sphere display device 200 in FIG. 2A, with the dome top touch screen 204 of the device 200 facing the viewer.

FIG. 2C shows a side view of the device 200 in order to reveal an image 211 displayed by the device 200, such as an image of a "Star Wars"-like interactive game. Star Wars is a registered trademark of Disney, Inc.

Figure 3:
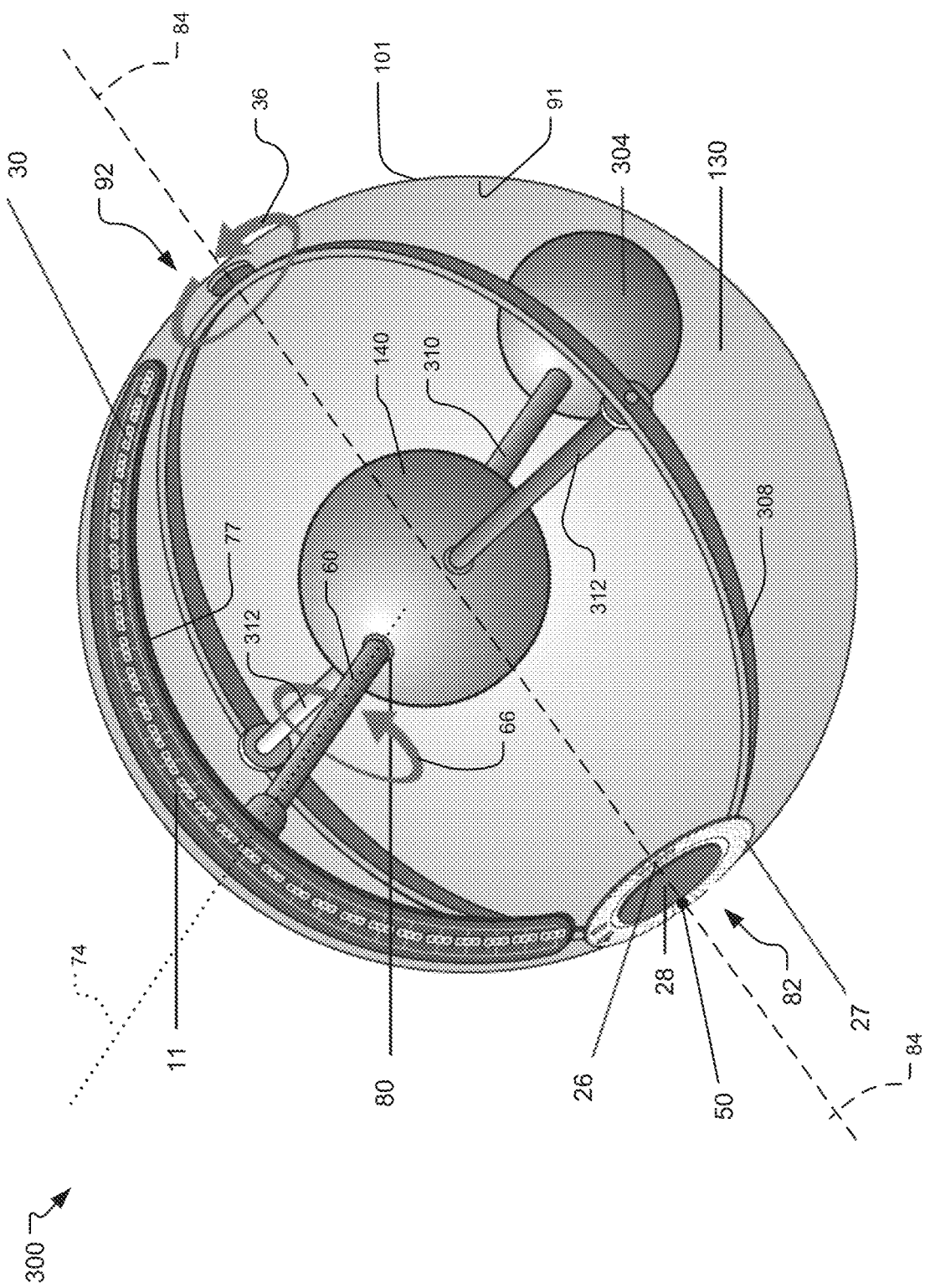
FIG. 3 is a schematic perspective view showing another embodiment of a light sphere display device that provides a 360 degree POV light display, where the device has dual rotation axes.

FIG. 3 illustrates yet another embodiment of a light sphere display device 300 constructed according to principles of the present invention. Such a device provides a 360 degree POV light up sphere gaming or entertainment device, with a dual axis rotation.

In more detail, the device 300 includes an outer globe 130 of clear plastic, and a central globe housing 140. The outer globe 130 is typically made from touch sensitive material, as in FIG. 1A. A counterweight 304 is attached to the central globe housing 140 via connector 310. The counterweight 304 includes a rechargeable battery. Otherwise, the central globe housing 140 has similar components as that described in FIG. 1A/1B.

A single strip of LEDs 14 are attached to a curved PCB 11. The curved PCB 11 includes LEDs 30, in one example. The curved PCB 11 is attached to a curved/arcurate support bar 77, which in turn connects to motor shaft 60. The motor shaft 60 rises out of the central globe housing 140 and rotates the combined arcurate support bar 77 and curved PCB 11. The combined arcurate support bar 77 and curved PCB 11 rotate about mid center axis 74 at rotational axis point 80, in direction 66. A motor shroud (not shown) covers the motor 2 that turns the motor shaft 60.

Shaft 310 connects the central globe housing 140 to the counterweight 304 such that the counterweight 304 and the support bar 77 directly oppose each other. Shafts 312 also connect the central globe housing 140 to arcurate shaped arms 308. Another motor (not shown) rotates the arcurate shaped arms 308 around top center axis 84, in direction 36. Because the arcurate shaped arms 308 are fasted to the central globe housing 140, the central globe housing 140 (and thus the entirety of the support bar 77/curved PCB 11 and counterweight 304) rotate as a unit about top center axis 84. The axes 84 and 74 are orthogonal with respect to each other, in one example.

Because the device 300 rotates the curved PCB 11 simultaneously around dual axes of rotation 84/74, a 360 degree POV display field is created. The dual rotational axes 84/74 enable creation of a light pattern that covers the entire inside surface 91 of the outer globe 130, creating the illusion of a sphere that is covered in light at outside surface 101 but requires only a fraction of actual LEDs 14 to do so. In one example, by rotating an arcurate support bar 77/curved PCB 11 including as few as 60 LEDs 14 about dual axes 84/74, the visual effect of possibly 40,000 LEDs can be achieved.

Also located on the outer globe 130 are mini USB jack 42, 4-way joystick button 46, audio speaker 48, microphone 38 and headphone jack 50.

Figures 4A, 4B:
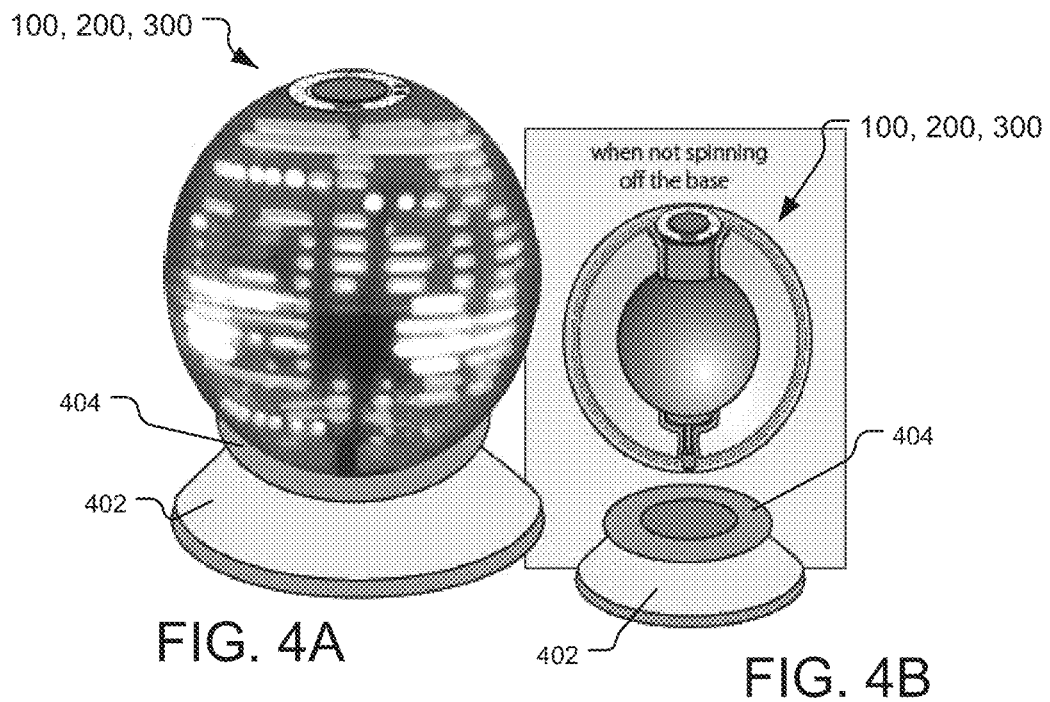
FIGS. 4A and 4B respectfully show an exemplary light sphere display device placed upon a presentation base and removed from the presentation base.

FIGS. 4A and 4B show a device (e.g. 100, 200, or 300) that is respectfully placed upon and removed from a presentation base 402. Such an application is useful for gaming and providing light shows, in examples.

The presentation base 402 has a sleeve 404 that holds the device 100/200/300 in place within the presentation base 402. In examples, the sleeve 404 includes ball bearings or bearings of other materials such as ceramics or teflon.

The presentation base 402 is typically a table top accessory. When sphere device 100/200/300 is placed on the sleeve 404, a group of people might play an interactive trivia game or skill and action game using fast reflexes to touch correct spots or images on the device 100/200/300. The outer touch sensitive display provided would register who touched the correct answer first or who touched the correct image, for example.

In another example, the user can program device 100/200/300 to provide a disco light show or to provide a digital birthday card. In other examples, the presentation base 402 works in conjunction with the device 100/200/300 as an alarm clock, light show, interactive music display, 3D television screen, or computer screen.

Figures 5A, 5B:
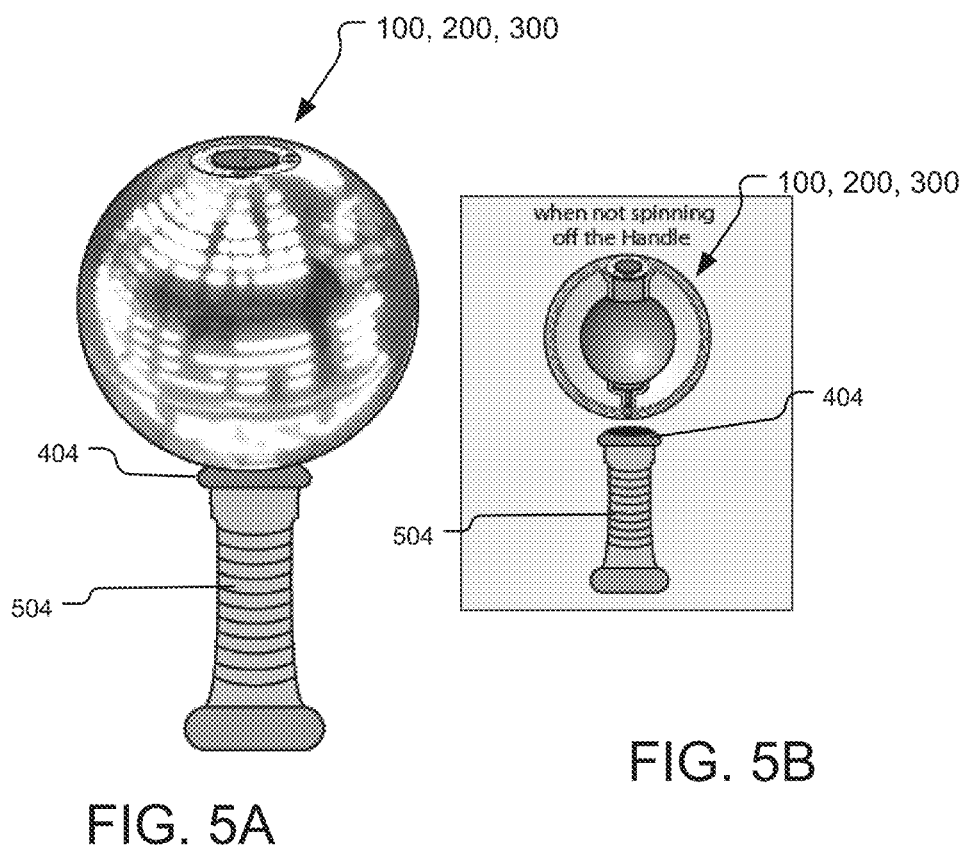
FIGS. 5A and 5B respectfully show an exemplary light sphere display device mounted to and removed from a handle.

FIGS. 5A and 5B show a device (e.g. 100, 200, or 300) that is respectively placed upon and removed from a handle 504, such as a wand. An individual might wave the combined handle and attached device through the air to create various visual displays and augmented reality experiences.

In one implementation, the handle 504 has a sleeve 404 within which the device 100/200/300 is placed. In one implementation, the handle 504 directly mounts to the device 100/200/300 via a small attachment screw hole in the base 82 of the device.

When sphere device 100/200/300 is placed on the sleeve 404, users may use the device as an interactive learning device. For example, a person could turn the device 100/200/300 in its sleeve, then touch an object to zoom in, feed video and expand the area of interest. In other examples, the combination of the handle 504 and device 100/200/300 operates as a magic crystal ball, wand, staff, or weapon such as a sword.

Figure 6A:
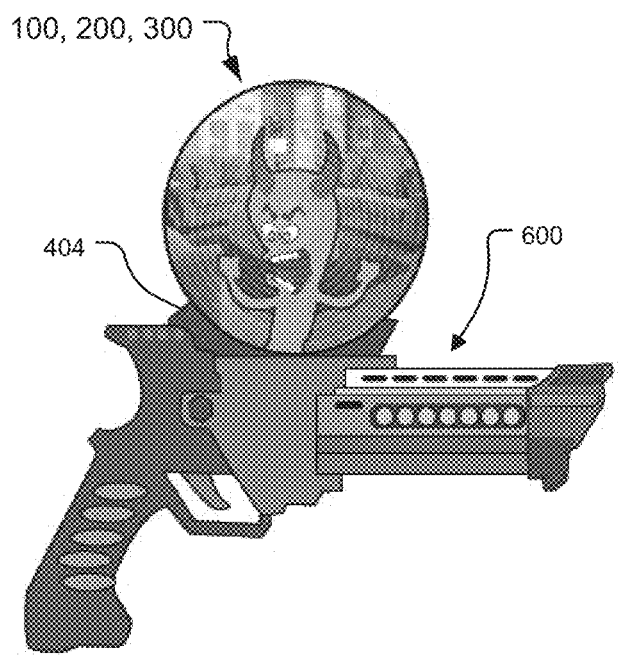
FIGS. 6A and 6B respectfully show an exemplary light sphere display device placed upon and removed from a gun gaming device.
Figure 6B:
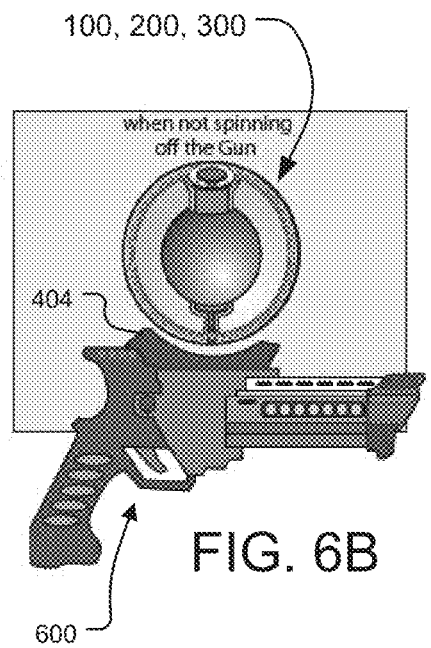

FIGS. 6A and 6B show a device 100/200/300 that is respectively placed upon and removed from a gaming gun 600, such as an augmented virtual reality gun. When the device 100 is placed upon a sleeve 402 of the gun 600, the exemplary device 100 can interact with the gun 600.

The camera 44 of the device 100/200/300 captures images of the scene, and the scene appears on the surface of the device. The device 100/200/300 communicates with and controls the gaming gun 600 such that individuals can point and shoot at virtual characters such as monsters projected onto walls by the device 100/200/300, in one example.

When sphere device 100/200/300 is placed on the sleeve 404, users may use the device as an interactive learning device. For example, a person could turn the device 100/200/300 in its sleeve 402, then touch an object to zoom in, feed video and expand the area of interest.

Figure 7A:
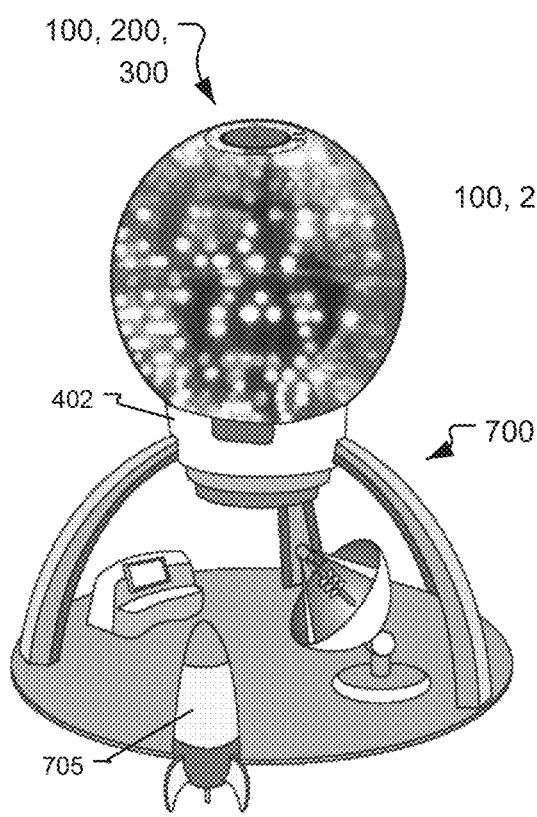
FIGS. 7A and 7B respectfully show an exemplary light sphere display device placed upon and removed from an interactive play set device.
Figure 7B:
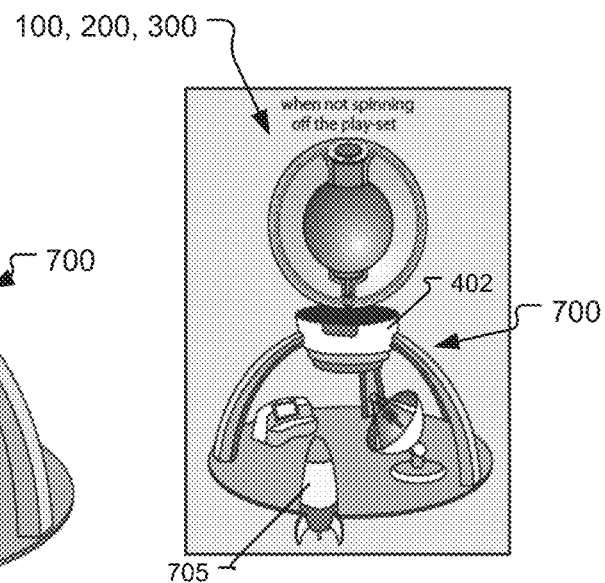

FIGS. 7A and 7B respectively illustrate an exemplary device 100/200/300 that is respectively placed upon and removed from an interactive play set 700, such as a smart play set. The exemplary device 100/200/300 operates as a 360 degree POV light up sphere of the playset 700.

When the device 100 is placed upon a sleeve 402 of the playset, the exemplary device 100/200/300 interacts with components of the interactive play set 700. The device identifies which base/sleeve it is in and can respond accordingly.

In the illustrated example, an interactive space themed playset is controlled by a device 100/300. A user might move the device 100/300 towards a spaceship 705 of the playset 700, and in response, the device 100/300 displays a 3D view of a control room of the spaceship 705, for example.

Figure 8B:
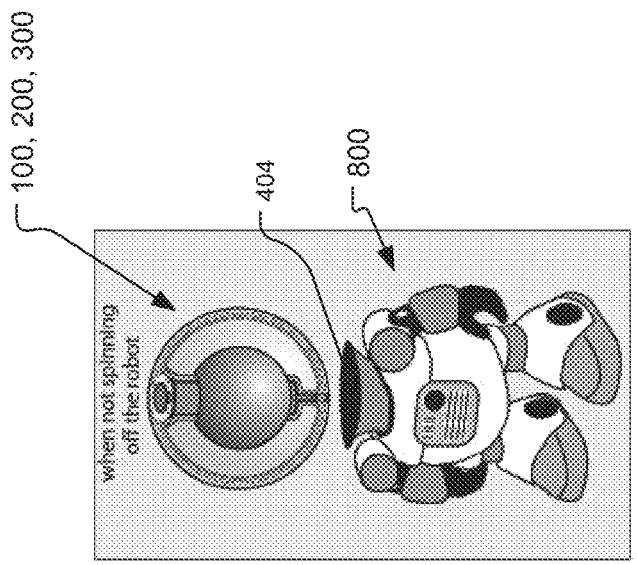
FIGS. 8A and 8B respectfully show an exemplary light sphere display device placed upon and removed from an action figure such as a robot.
Figure 8A:
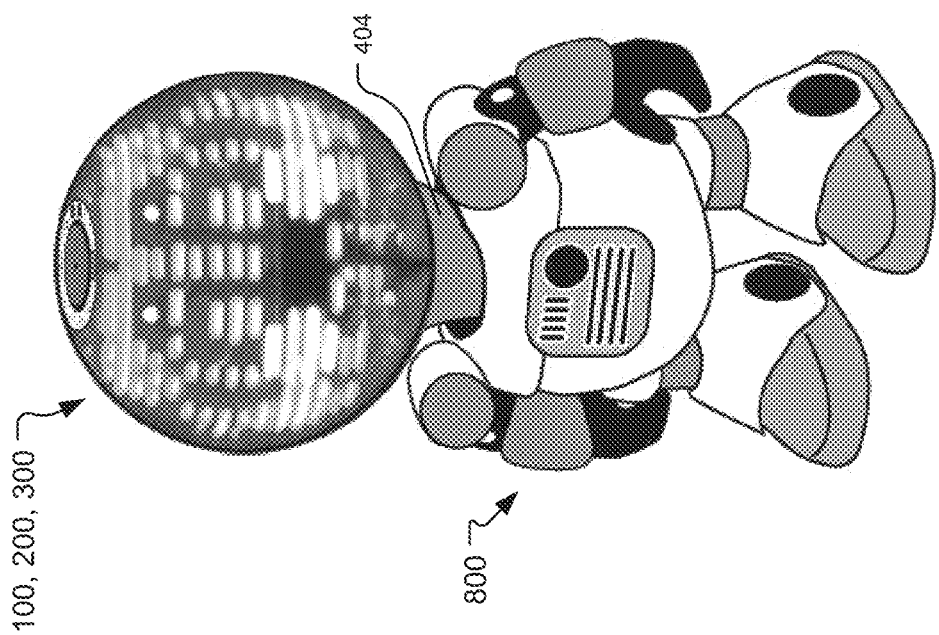

FIGS. 8A and 8B respectively illustrate an exemplary device 100/200/300 that is respectively placed upon and removed from an action FIG. 800, such as a doll or robot.

When the device 100 is placed upon a sleeve 402 of the robot 800, the exemplary device 100/200/300 operates as a 360 degree POV light up sphere head of the robot 800. The device 100/200/300 identifies that is placed on the action FIG. 800, and the robot 800 in response becomes active (i.e. "comes alive").

FIGS. 9A-9C show different examples of cell phones 102 communicating with the devices 100/200/300 over a wireless channel 902 such as Bluetooth. In this way, exemplary device 100/200/300 operates as a 360 degree persistence of vision light up sphere that communicates wirelessly with applications ("apps") executing on user devices 102 such as cell phones. In the examples, Bluetooth signals such as Bluetooth Low Energy (BLE) are used.

Using open source programming, in one example, users can create custom games, devices and light effects. In this way, the device 100/200/300 becomes an open source educational tool.

In more detail, in FIG. 9A, a cell phone 102 or other user device such as a tablet or laptop can be used to create games and design images or custom displays. The games and/or images are typically designed using an app executing upon an operating system of the cell phone 102. The cell phone 102 then sends the games and/or images over the wireless channel 902 to the device 100, and the games and/or images appear on the device in response.

In FIG. 9B, a cell phone 102 can be used to send light up messages, displays or light shows over the over the wireless channel 902 to the device 100/200/300, which then appear on the device.

In FIG. 9C, users on user devices such as cell phones send games or puzzles to the device 100/200/200 over wireless channel 902. The games/puzzles appear on the device and light up in 360 degrees, according to embodiments of the present invention.

Figure 10:
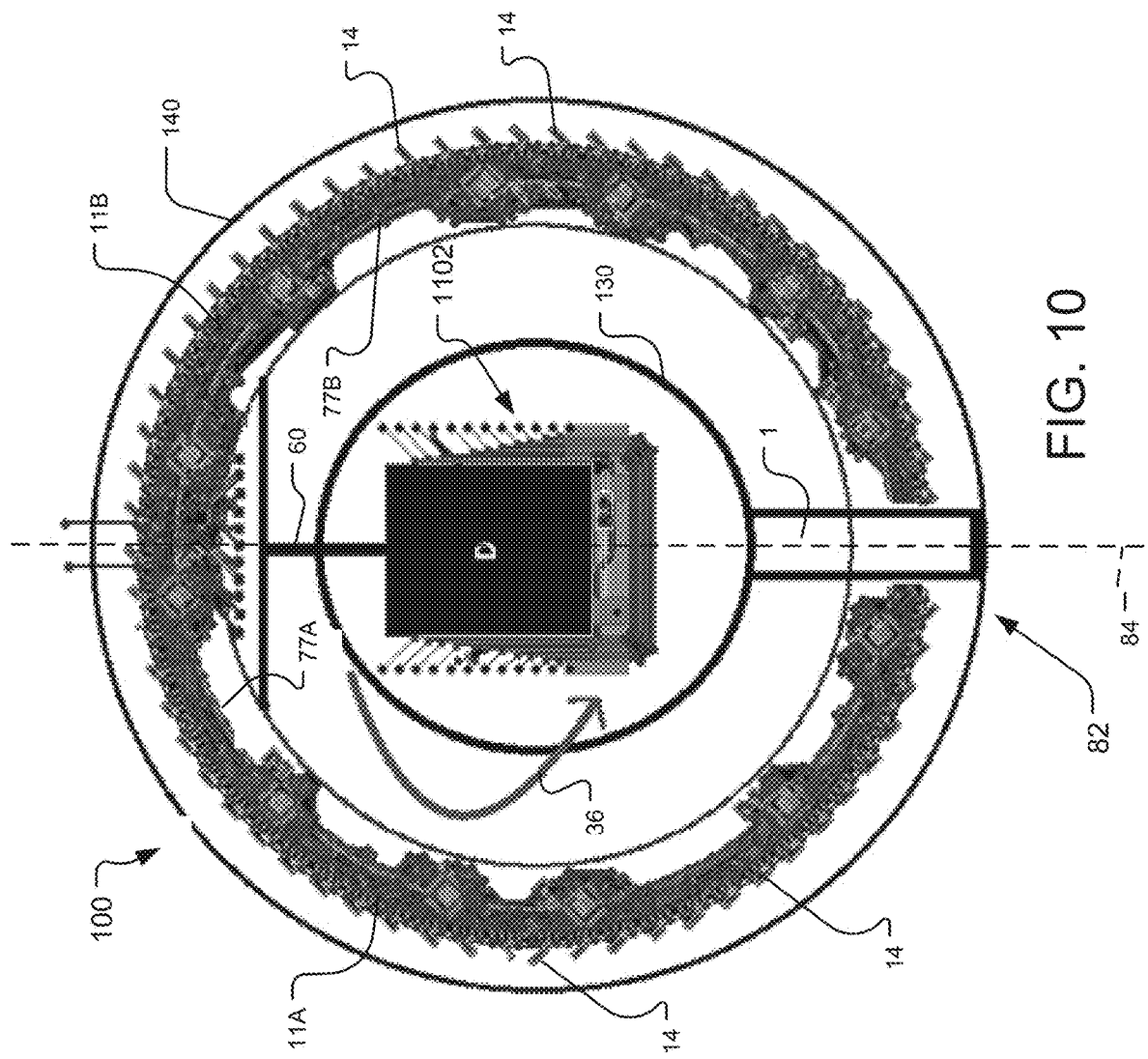
FIG. 10 shows a cutaway view of an early prototype of the light sphere display device as in of FIG. 1, where components of a control box are shown, and where the control box is shown within a central globe housing, according to an embodiment.

FIG. 10 is a cutaway view of device 100 as described in FIGS. 1A/1B. Here, the various components that are displayed within the central globe housing 140 in FIG. 1B are included in a more compact fashion within a control box 1102.

Figure 11:
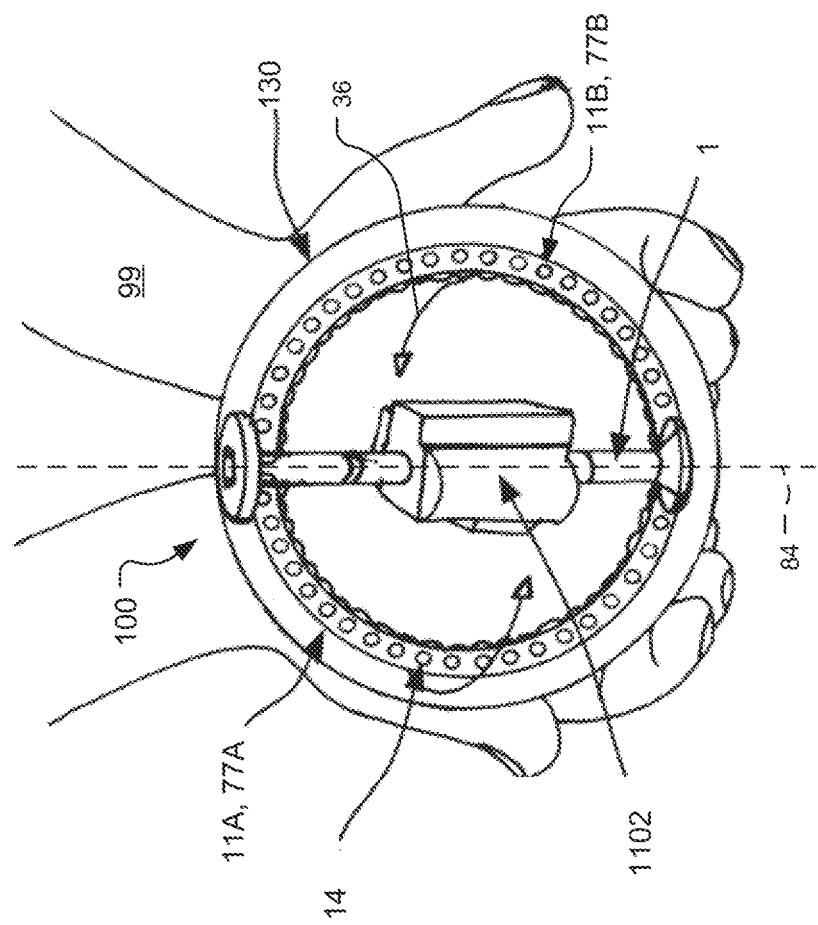
FIG. 11 shows a cutaway view of a prototype light sphere display device as in FIG. 10, where the light sphere display device is held by an individual.

FIG. 11 is a cutaway view of the device 100 of FIGS. 1A/1B to reveal control box 1102 within the central globe housing 140. The device 100 is shown being held in the hands of an individual 99. The control box 1102 includes exemplary components such as motor 2, battery box 1, 3D orientation sensors 10, wireless transceiver 5, audio speaker 27, and audio driver 20.

Figure 12:
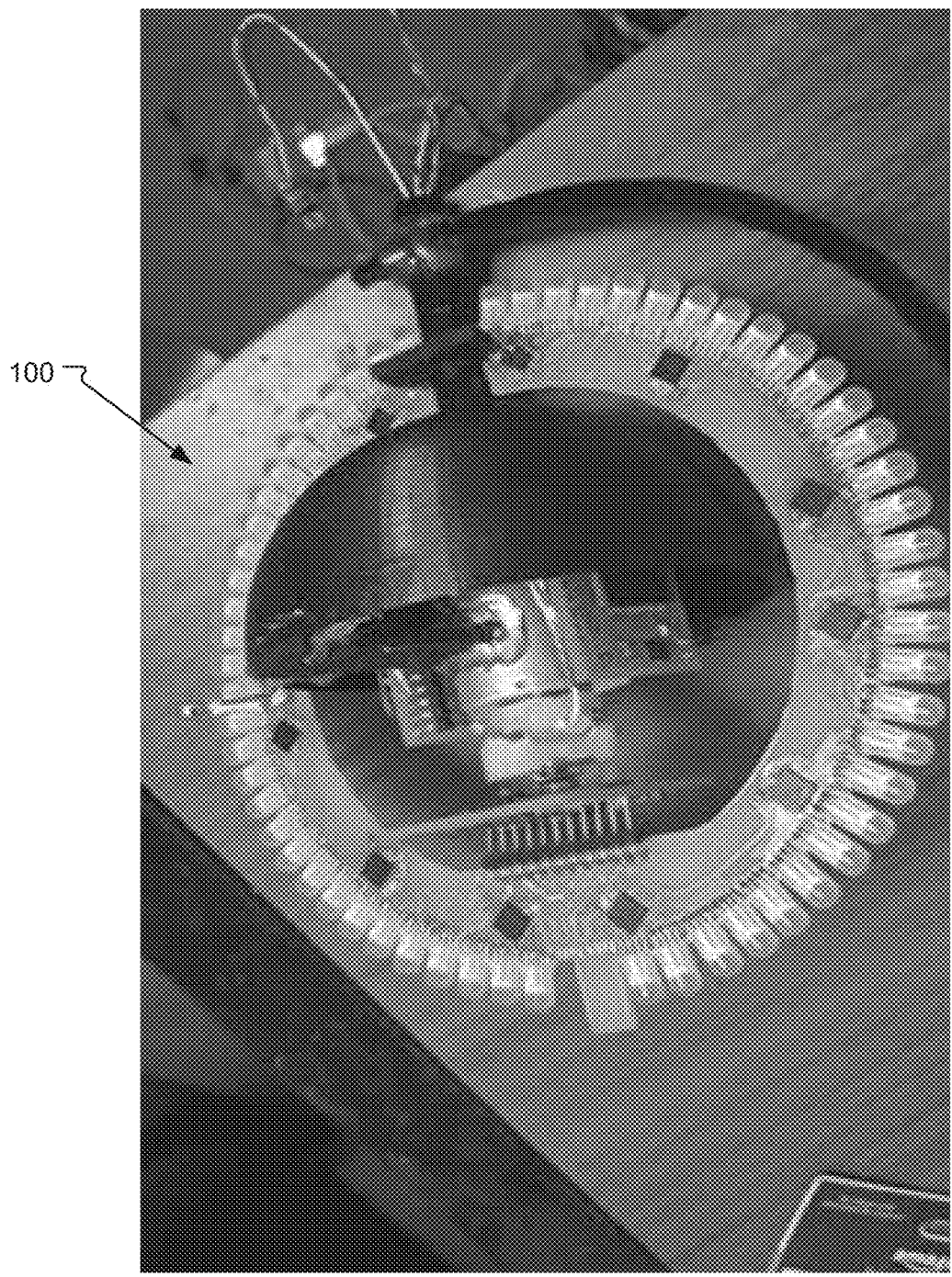
FIG. 12 shows an early prototype of the light sphere display device of FIG. 1A.

FIG. 12 shows an early prototype of the device 100 of FIG. 1A.

While this invention has been particularly shown and described with references to preferred embodiments thereof, it will be understood by those skilled in the art that various changes in form and details may be made therein without departing from the scope of the invention encompassed by the appended claims.

What is claimed is:

1. A display device, comprising:
    an outer spherical globe; and
    a display system inside the spherical globe that includes one or more rotating bars of light elements;
    wherein the device rotates the one or more bars within the outer globe about at least one axis of rotation to provide a persistence of vision (POV) light display perceived at the outer surface of the outer globe.

2. A device as claimed in claim 1, wherein the rotating bars include lines of light emitting diode (LED) light elements.

3. A device as claimed in claim 1, wherein the bars comprise two arcuate support bar branches disposed oppositely to one another with respect to a center axis of the device.

4. A device as claimed in claim 3, wherein each of the arcuate support bar branches have attached curved PCBs of LEDs.

5. A device as claimed in claim 1, wherein the bar is flat support bar that the device rotates about a mid center axis to provide a POV light display upon a portion of the inside surface of the outer globe.

6. A device as claimed in claim 1, further comprising a battery inside the spherical globe for powering the display system.

7. A device as claimed in claim 1, further comprising a printed circuit board within the spherical globe.

8. A device as claimed in claim 1, further comprising a motor within the spherical globe that rotates the bars of light elements.

9. A device as claimed in claim 1, wherein the rotating light bars have at least 32 light elements.

10. A device as claimed in claim 1, further comprising a transceiver module inside the spherical globe that enables wireless connectivity to an outside world.

11. A device as claimed in claim 1, further comprising a GPS transceiver inside the spherical globe that enables geolocation-awareness.

12. A display device, comprising:
an outer spherical globe;
a display system inside the spherical globe that includes one or more rotating bars of light elements;
wherein the device rotates the bar about the top center axis to provide a 360 degree POV light display perceived at the outer surface of the outer globe.

13. A display device, comprising:
an outer spherical globe;
a display system inside the spherical globe that includes one or more rotating bars of light elements; and
a microcontroller, inside the spherical globe, that synchronizes a position of the rotating bars and updates the light elements corresponding with their respective positions within an image that is being displayed by the display device.

14. A display device, comprising:
an outer spherical globe;
a display system inside the spherical globe that includes one or more rotating bars of light elements; and
a microcontroller inside the spherical globe that queries accelerometers to determine an orientation of the device within a gravitational field and uses the detected orientation to control a game.

15. A device as claimed in claim 14, wherein the accelerometers include three mutually orthogonally oriented accelerometers.

* * * * *